(12) United States Patent
Tompkin et al.

(10) Patent No.: US 8,562,026 B2
(45) Date of Patent: Oct. 22, 2013

(54) SECURITY ELEMENT AND PROCESS FOR THE PRODUCTION OF A SECURITY ELEMENT

(75) Inventors: Wayne Robert Tompkin, Baden (CH); Michael Scharfenberg, Nuremberg (DE); Ludwig Brehm, Adelsdorf/Deutschland (DE); Andreas Schilling, Hagendorn (CH)

(73) Assignee: OVD Kinegram AG, Zug (CH)

( * ) Notice: Subject to any disclaimer, the term of this patent is extended or adjusted under 35 U.S.C. 154(b) by 770 days.

(21) Appl. No.: 12/683,167

(22) Filed: Jan. 6, 2010

(65) Prior Publication Data
US 2010/0173133 A1 Jul. 8, 2010

(30) Foreign Application Priority Data
Jan. 7, 2009 (DE) .......................... 10 2009 004 251

(51) Int. Cl.
*B42D 15/00* (2006.01)
*B42D 15/10* (2006.01)

(52) U.S. Cl.
USPC ................... 283/94; 283/72; 283/73; 283/85; 283/86; 283/98; 283/110

(58) Field of Classification Search
USPC ....................... 283/72, 73, 85, 86, 94, 98, 110
See application file for complete search history.

(56) References Cited

U.S. PATENT DOCUMENTS

| | | | |
|---|---|---|---|
| 6,060,143 A | 5/2000 | Tompkin et al. | |
| 6,222,650 B1 * | 4/2001 | Long | 283/86 |
| 2003/0039847 A1 * | 2/2003 | Dalakos | 428/448 |
| 2008/0037131 A1 | 2/2008 | Steenblik et al. | |
| 2010/0038659 A1 * | 2/2010 | Chen et al. | 257/98 |

FOREIGN PATENT DOCUMENTS

DE 102006029536 12/2007
EP 1091267 A2 4/2001

OTHER PUBLICATIONS

Joubert et al., Holographic Optical Components for High Brightness Single-LCD Projectors, Proceedings of the SPIE Engineering, SPIE, US, Bd. 3013, Jan. 1, 1997, p. 98-106, XP007912459ISSN: 0277-786X.

* cited by examiner

*Primary Examiner* — Dana Ross
*Assistant Examiner* — Justin V Lewis
(74) *Attorney, Agent, or Firm* — Hoffmann & Baron, LLP

(57) ABSTRACT

The invention concerns a security element (3') having a top side and an underside and a process for the production thereof. The security element has a transparent layer (33') with a non-homogenous refractive index, in which a plurality of Bragg planes are formed by a refractive index variation. The transparent layer (33') is of a layer thickness of between 5 μm and 200 μm and the transparent layer (33') has a plurality of first zones (41) of a smallest dimension of less than 300 μm, which are arranged in accordance with a first grid raster in a one-dimensional or two-dimensional succession in mutually adjacent relationship and in which the Bragg planes of the transparent layer are respectively shaped to provide a respective transmissive optical imaging function.

29 Claims, 2 Drawing Sheets

SECURITY ELEMENT AND PROCESS FOR THE PRODUCTION OF A SECURITY ELEMENT

BACKGROUND OF THE INVENTION

The invention concerns a security element comprising a transparent layer with a non-homogenous refractive index and a process for the production of such a security element.

It is known for a photopolymer film, in the volume of which items of information are holographically stored, to be used as security elements for protecting security documents, for example bank notes, identity cards and passes, passports, check forms, entry cards, tickets or vouchers. Thus for example EP 1 091 267 A2 describes a security element comprising a photosensitive layer which is laminated in place between two carrier layers and in which an optically perceptible item of information is stored, in particular a 3D hologram of an object, and becomes visible when illuminated.

OBJECTS AND SUMMARY OF THE INVENTION

Now the object of the invention is to provide an improved security element for safeguarding security documents and a process for the production of such a security element.

That object is attained by a security element having a top side and an underside, which has a transparent layer with a non-homogenous refractive index, in which a plurality of Bragg planes are formed by a refractive index variation, wherein the transparent layer is of a layer thickness of between 5 µm and 200 µm and wherein the transparent layer has a plurality of first zones of a smallest dimension of less than 300 µm, which are arranged in accordance with a first grid raster in a one-dimensional or two-dimensional succession in mutually adjacent relationship and in which the Bragg planes of the transparent layer are respectively shaped to provide a respective transmissive optical imaging function. That object is further attained by a process for the production of a security element, in which a photosensitive layer of a layer thickness of between 5 µm and 200 µm is provided, the photosensitive layer is exposed to light in such a way that there is formed in the photosensitive layer a plurality of first zones of a smallest dimension of less than 300 µm, which are arranged in accordance with a first grid raster in a one-dimensional or two-dimensional succession in mutually adjacent relationship and in which a plurality of Bragg planes formed by a refractive index variation are respectively shaped for providing a respective transmissive optical imaging function, and the photosensitive layer is then hardened.

In contrast to known security elements, in accordance with the invention no (three-dimensional) representation of an object or another item of optically variable information is generated by the Bragg planes, but rather the Bragg planes are shaped in a plurality of regions which are below the resolution capability of the human eye to provide optical transmissive imaging functions. It is possible in that way to generate novel optical effects which are used as optical security elements. In addition the security feature according to the invention is distinguished in that it cannot be copied by galvanic or mechanical contact copying or holographic copying. That means that the forgery-resistant nature of the security element is further improved, in particular also in comparison with conventional refractive lenses. Thus the invention provides a security element which can only be forged and copied with very great difficulty, for safeguarding security documents, which nonetheless can be easily and inexpensively industrially produced.

Advantageous configurations of the invention are set forth in the appendant claims.

The photosensitive layer preferably comprises photopolymer, silver halide emulsions, or dichromatic gelatin.

In accordance with a preferred embodiment of the invention the Bragg planes of the transparent layer in the first zones are adapted to provide identical transmissive imaging functions. It is possible in that way to achieve interesting optically variable effects, in particular in conjunction with the pattern layer described hereinafter. It is however also possible for the Bragg planes of the transparent layer in the first zones to be adapted to provide different transmissive imaging functions. It is possible in that way to achieve interesting motion effects and to encode items of macroscopic information into the security element.

Preferably the Bragg planes in the first zones are respectively arranged in mutually parallel relationship and are respectively spaced from each other at between 200 nm and 700 nm, preferably between 260 nm and 460 nm, with a refractive index of the material disposed between the Bragg planes of about 1.5. Moreover the Bragg planes are preferably respectively equidistantly spaced from each other in the first zones. Preferably in that case the Bragg planes in the first zones respectively include an angle of between about 5° and about 45° with the plane defined by the top side of the security element. Further preferably in that case the angle varies with depth, that is to say in dependence on a direction perpendicular to the defined plane. Investigations have shown that, when those conditions are met, it is possible to achieve a particularly good optical efficiency in respect of the imaging functions.

By way of example prismatic imaging functions or also positive or negative lens functions can be provided in the first zones as the transmissive imaging function. The term prismatic imaging functions is used to denote optical imaging functions which correspond to imaging by a triangular or trapezoidal, refractively acting, optical element comprising a transparent material which differs in refractive index from the surrounding medium. Preferably, in the case of a prismatic imaging function, the light incident in a first region is deflected at a positive angle, in particular an angle $\alpha$, and the light incident in a second region is deflected at a negative angle, in particular the angle $-\alpha$, that is to say deflected in different, mutually opposite directions with respect to the beam axis. In that respect it can further be provided that in further regions the incident light is deflected at another positive or negative angle respectively and/or first, second and optionally further regions iteratively occur in succession.

An example of a transmissive optical imaging function is for example $1/F = 1/S_1 + 1/S_2$, wherein $S_1$ represents the object distance and $S_2$ represents the image distance. F can in that case be a constant but can also vary in dependence on location.

Deflection of the incident light by the optically transmissive imaging function preferably varies in one direction or in different directions. Thus it is for example possible for deflection of the incident light to vary continuously in a first direction which is in the plane defined by the top side of the security element, and for deflection to be constant in a second direction which is in the plane defined by the top side of the security element and which is preferably at a right angle to the first direction. In addition it is also possible for the deflection to vary continuously in the second direction in space, such as for example in the case of a spherical lens function. Furthermore it is also possible for regions with a respectively constant but mutually different deflection of the incident light to occur in succession in the first direction (prismatic imaging function) and for deflection to be constant in the second direction in space or for regions involving differing deflection of the incident light also to occur in succession here.

Preferably in that case the first direction corresponds to the direction of the smallest dimension of a zone.

Thus it is for example possible that, in the first zones, a respective plurality of Bragg planes intersects a section plane oriented almost perpendicularly to the top side of the transparent layer, in a section line which has an arcuate portion and is of a length of more than 5 μm, wherein the circle diameter of the circular arc is between 5 μm and 250 μm. In addition it is also possible that not just such a section plane occurs in the first zones, but that a plurality of such section planes can be defined there.

Here the term smallest dimension of a zone is used to denote the smallest dimension of the area occupied by the zone, that is to say the shortest distance of the points of intersection of a straight line laid through the centroid of the zone, with the boundary line of the zone.

In accordance with a preferred embodiment of the invention, for the production of a security element with a transparent layer of such a nature, a first master is arranged on the front side of the photosensitive layer and a second master on the rear side thereof, more specifically in such a way that the first master is brought into contact with the front side of the photosensitive layer directly or with the interposition of a transparent optical medium and the second master is brought into contact with the rear side of the photosensitive layer directly or with the interposition of a transparent optical medium. In that case the transparent optical medium can also comprise a plurality of transparent layers. It is also possible to use liquids as the transparent optical medium, for example oil, glycerin or water as the transparent optical medium. Advantageously the transparent optical medium has a refractive index which is almost equal to or only very slightly differs from (for example between 0.2 and 0.5) the refractive index of the photosensitive layer. The photosensitive layer is then exposed with an interference pattern formed by the superpositioning of two coherent light beams. In that case the first master is arranged in the beam path of the one light beam and the second master in the beam path of the other light beam so that the two interfering light beams are respectively influenced by the one master and by the other master. It has been found that such an optical arrangement makes it possible to achieve the desired shaping of the Bragg planes and the transparent layer produced in that way is found to be particularly forgery-resistant. To produce the Bragg planes in the photosensitive layer, two masters arranged on the mutually opposite sides of the photosensitive layer are employed so that reproduction of the security element using only one master is not possible. Furthermore, to produce Bragg planes, it is also possible to use superpositioning of a first beam by the first master from the first side with a second simple beam which is not deflected or modified by a second master.

Transparent masters can be used as the first and second masters. It is however also possible to use a reflective master as the first master or as the second master, and thus for the second or the first master to be arranged in the beam path of both light beams, that is to say in the beam path of the first and second light beam. In that respect holographic masters with a volume hologram layer can be used as the masters. Preferably however the first and second masters employed are masters having a surface structure which is shaped in one or more layers of the respective master and influences the incident light by diffraction, reflection and/or refraction. In that respect it is also possible for the first or the second master to have a reflection layer so that the first or the second master acts as a reflective master, as was already described hereinbefore. In that respect the reflection layer can also be provided only partially above or below the surface structure. It is possible for example to provide in that way that the intensity of the reflection can be influenced or unwanted or interfering regions of the surface structure can be reduced in respect of their reflection capability.

In addition it is also possible for the first master used to be a transmissive master which is provided with a surface relief, and for the second master to be only a flat reflective surface, or for a partially transparent mirror to be used as the first master and for a reflective master provided with the surface relief to be used as the second master.

Thus, in accordance with a preferred embodiment of the invention, a first surface structure is formed in a layer of the first master and a second surface structure is shaped in a layer of the second master. In that respect the first and second surface structures preferably involve mutually inverse surface structures. Inverse in that case signifies that the surface structures are shaped in relation to each other at a surface structure which is mirrored parallel to the surface of the photosensitive layer. The use of such inverse surface structures makes it possible, in particular in combination with one of the two masters being in the form of a reflective master, to achieve particularly good results in regard to the optical imaging quality that can be achieved in respect of the transparent layer.

Preferably the first surface structure is arranged at a spacing from the top side of the photosensitive layer of between 0 μm and 200 μm and/or the second surface structure is arranged at a spacing from the underside of the photosensitive layer of between 0 μm and 200 μm.

It has proven desirable to use diffractive surface structures as the first and second surface structures, wherein the spacing of the structure elements and/or the flank steepness of the structure elements decreases or increases in at least one direction starting from the center point of each first zone towards the boundary line of the respective first zone. Thus it is for example possible to adopt as the first or second surface structure a diffractive surface structure having asymmetrical structure elements and involving a spacing between the individual structure elements of between 200 nm and 10 μm, which satisfies the foregoing conditions. Preferably in that case the spacing of the structure elements decreases and at the same time in parallel therewith the flank steepness of the structure elements increases in at least one direction starting from the center point of each first zone to the boundary line of the respective first zone. In that respect it is further possible for that prerequisite to be applied not only for one direction but for two directions or for a multiplicity of directions. That makes it possible to write for example Bragg planes for providing a transmissive lens function as the transmissive optical imaging function in the first zone. In addition it is also possible to provide a diffractive surface structure having asymmetrical structure elements and a spacing between the individual structure elements of between 200 nm and 10 μm as the first or second surface structure, wherein each first zone has at least two regions, a first region and a second region, in which the flank steepness of the asymmetrical structure elements differs. Thus it is for example possible for the structure elements to be shaped in mutually mirror-image symmetrical relationship in the first and second regions, that is to say in the first region the shallower flanks of the structure elements are oriented in mutually opposite directions. In that case the structure elements are preferably respectively identically shaped in the first and second regions. Surface structures of that kind are particularly suitable for writing Bragg planes into the first zones which as the optical imaging function provide a prismatic transmissive optical imaging function. In that case the individual structure elements are arranged in mutually equidistant relationship in the first region and/or in the second region whereas the flank inclination (of the shallower flank) differs from each other in the first and second regions, in particular in the first region including a positive angle and in the second region a negative angle, relative to the surface normal of the top side of the photosensitive layer.

Preferably the first and/or second surface structure has a binary surface structure with a spacing of the structure elements in the range of between 50 nm and 1000 nm. The term binary surface structure is used to denote a surface structure which is composed of symmetrical structure elements approximating to a rectangular profile. In this case also preferably the spacing of the structure elements decreases in at least one direction starting from the center point of each first zone to the boundary line of the respective first zone. It is also possible in that case for the spacing of the structure elements to correspondingly decrease not only in one direction but in two or in a multiplicity of directions.

It is further also possible for each first zone to have two regions, a first region and a second region, in which the structure elements are respectively arranged in mutually equidistant relationship and in addition the spacing of the structure elements and/or the width of the structure elements in the first region differs from that in the second region.

In addition it is also possible for the first and/or the second surface structure to have a multiplicity of lens-form structures. Furthermore it is also possible for the first master and/or the second master to have a multiplicity of opaque regions and a multiplicity of transparent regions and for the spacing of successive opaque regions to decrease in at least one direction starting from the center point of each first zone to the boundary line of the respective first zone. Preferably that applies not only for one direction but for two directions or a multiplicity of directions.

In addition it is also possible for one of the masters to comprise a multiplicity of transparent regions which are in the form of holes or slots and which are surrounded by opaque regions or regions whose transmissivity differs from the regions in hole or slot form.

Preferably in that case the regions in slot or hole form are arranged in register relationship with the surface structure of the other master which for example as described hereinbefore has asymmetrical structure elements, binary structure elements or lens-form structure elements.

In accordance with a preferred embodiment of the invention the first master and/or the second master are in the form of an exposure roller provided with an optically active surface structure or a pattern of opaque and transparent regions, as described hereinbefore. Preferably in that case both masters are in the form of two mutually oppositely disposed and synchronously moving exposure rollers. It is possible in that way to achieve the necessary precision upon exposure of the photosensitive layer. In addition it is possible for the first or second master to be in the form of a replication roller having a metal surface in which a surface structure of a configuration as described hereinbefore is shaped. The use of such a roller has proven desirable in the production of the security element according to the invention.

In accordance with a further alternative advantageous embodiment of the invention the first master and/or the second master are produced in the form of a flat, in particular plate-shaped exposure mask which as described hereinbefore is provided with an optically active surface structure or a pattern of opaque and transparent regions. Preferably in that case both masters are in the form of two mutually oppositely arranged and mechanically coupled exposure masks. Mechanical coupling allows synchronous vertical movement of both exposure masks to alter the spacing relative to the photosensitive layer and to prevent displacement of the exposure masks relative to each other. It is possible in that way to achieve the necessary precision upon exposure of the photosensitive layer.

In a preferred embodiment of the invention the security element further has a pattern layer with a plurality of second zones of a smallest dimension of less than 300 μm, which are arranged in accordance with a second grid raster in a one-dimensional or two-dimensional succession in mutually adjacent relationship. In that case each second zone has a pattern region and a background region which differ in their optical properties and which are shaped to provide a coding. Interesting and easily remembered optically variable effects can be achieved by the superpositioning of the transparent layer with a pattern layer of such a nature. Examples of such effects are image change effects (image flip), 2D-moiré effects, 1D moiré effects, 3D images (stereogram), so-called wobbly images (also change image, lens raster image, lenticular image or prism raster image), and Scrambled Indicia®.

Preferably the pattern regions and the background regions are shaped in the second zones for providing identical codings. In that way it is possible to achieve macroscopic enlargement and retardation effects in respect of the coding, which result in an optically variable image impression.

In addition it is also possible for the pattern regions and background regions to be shaped in a first group of second zones to provide identical first codings and to be provided in a second group of second zones to afford identical second codings, wherein the first and second codings are different codings. That makes it possible to achieve further interesting optical effects. Thus it is possible for example to provide mutually juxtaposed regions occupied with different optically variable items of information. Preferably in that case the multiplicity of second zones of the first group are arranged in mutually adjacent relationship and occupy a first region of a smallest dimension of more than 300 μm. A multiplicity of second zones of the second group are preferably also arranged in mutually adjacent relationship and occupy a second region of a smallest dimension of more than 300 μm.

The first and second grid rasters are preferably each in the form of periodic rasters with a respectively constant raster width in at least one spatial direction. The rasters can be one-dimensional rasters in which there is a succession of zones arranged in mutually adjacent relationship in a spatial direction defined by a vector. The first and second rasters however can also be in the form of two-dimensional rasters involving a succession of zones which are in adjacent relationship in two different directions defined by respective vectors. In that case the two vectors include an angle of more than 0° with each other and are preferably arranged at a right angle relative to each other. The first and second rasters can also involve a transformed raster in which the vectors defining the raster are transformed in a circular shape or in a wiggly line shape.

In accordance with a preferred embodiment of the invention the first and second rasters involve identical rasters which however are arranged at an angular displacement of between about 0° and about 45° relative to each other. It is possible in that way to achieve interesting optically variable motion effects, wherein in particular many motion effects are in an angular range of between about 0° and about 2°.

In addition it is also possible for the first and second grid rasters to differ in at least one spatial direction in their raster width at between 0% and 5%. That also makes it possible to achieve interesting motion effects.

The background region and the pattern region can differ from each other in their optical properties in that the pattern region and the background region are of a differing color, the background region and the pattern region differ in their transmissivity or opacity, the pattern region and the background region differ in their reflection properties or also the pattern layer has a layer in which different surface structures are shaped in the background region and in the pattern region. Such different surface structures preferably involve different diffractive surface structures which differ for example in their azimuth, their structure depth, their spatial frequency or their relief shape. Furthermore it is also possible for a matt structure, a blaze grating or a zero-order diffraction structure to be shaped as the surface structure in the pattern region and/or in the background region.

In addition it is also possible for the pattern layer to have a partial reflection layer which is provided in the pattern region and not provided in the background region or which is provided in the background region and not in the pattern region. That reflection layer can further also be occupied by a surface structure, as was described hereinbefore. It is possible for the transparent layer to be brought into contact with an uncoded pattern layer and for the coding to be implemented in situ. For example the transparent layer can be applied to an ID card having a laser-writable layer, wherein a laser then writes the laser-writable layer, the laser beam being deflected in accordance with the optical imaging function implemented by the Bragg planes.

BRIEF DESCRIPTION OF THE DRAWINGS

The invention is described by way of example hereinafter by means of a number of embodiments with reference to the accompanying drawings.

DETAILED DESCRIPTION OF THE PREFERRED EMBODIMENTS

Figure 2:
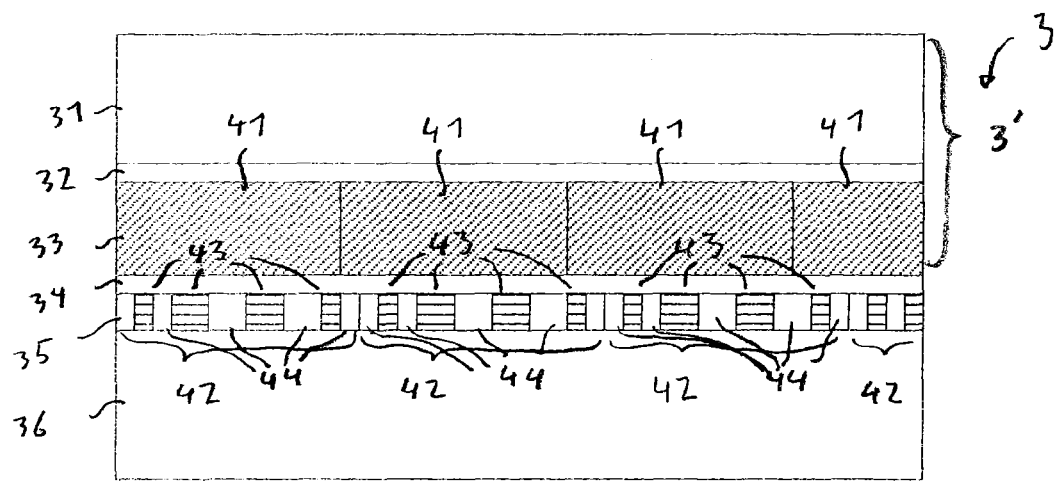
FIG. 2 shows a diagrammatic view in section of the security element according to the invention.

FIG. 2 shows a security element 3 comprising a carrier layer 31, an adhesive bonding layer 32, a transparent layer 33, an adhesive bonding layer 34, a pattern layer 35 and an adhesive layer 36.

The carrier layer 31 is preferably a transparent plastic film of a thickness of between 12 µm and 250 µm, preferably between 19 µm and 120 µm (between 12 µm and 23 µm for bank notes and between 20 µm and 120 µm for ID documents). In this case the plastic film preferably comprises PET, BOPP, OPP, PC, PEN or Mylar® (polyethylene terephthalate polyester film from DuPont). The top side of the carrier layer 31 can additionally have protective layers.

The adhesive bonding layers 32 and 34 are of a layer thickness of between 20 nm and 5 µm. With a suitable choice of material for the carrier layer 31, the transparent layer 33 and the pattern layer 35, it would also be possible to dispense with the adhesive bonding layers 32 and 34. In addition the adhesive bonding layers 32 and 34 preferably also serve as barrier layers which protect the transparent layer 33 from environmental influences which could cause subsequent swelling or shrinkage of the transparent layer 33 and thus a change in the optical properties of the transparent layer 33. That barrier layer 34 can also be applied subsequently after exposure of the volume hologram.

Instead of the adhesive bonding layer 32 it is also possible to provide a release layer.

The transparent layer 33 is a layer with a non-homogenous, location-dependent refractive index, wherein a multiplicity of Bragg planes are produced by a refractive index variation in the transparent layer 33, by virtue of that refractive index pattern of a three-dimensional nature. The transparent layer 33 is of a layer thickness of between 5 µm and 200 µm, further preferably a layer thickness of between 20 µm and 100 µm. In that case the layer thickness influences the number of Bragg planes in the transparent layer 33 and thus influences the optical effect generated by the transparent layer 33.

Figure 3:
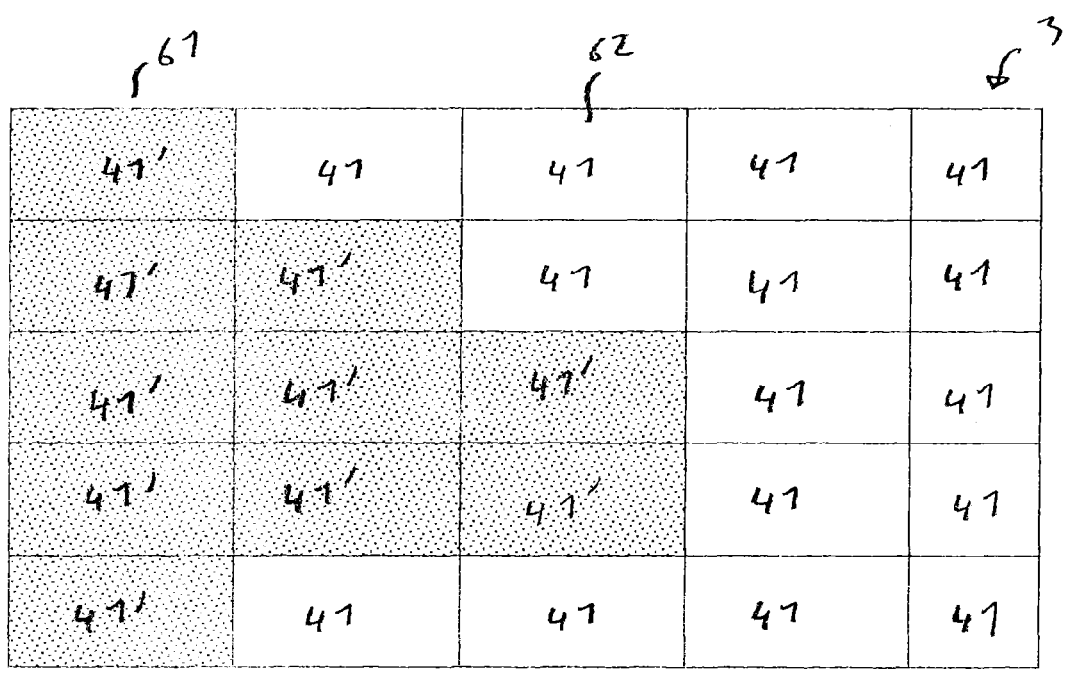
FIG. 3 shows a diagrammatic plan view of a portion of the security element of FIG. 2.

As indicated in FIG. 2 the transparent layer 33 has a multiplicity of zones 41 which are arranged in accordance with a grid raster in a succession in mutually adjacent relationship. In the FIG. 2 embodiment the zones 41 are arranged in a regular two-dimensional raster defined by two vectors which are at a right angle to each other. The raster widths along the one vector and the other vector are in this case preferably selected to be less than 300 µm, further preferably less than 100 µm. In addition it is also possible that—as shown in FIG. 3—the raster widths along the one vector are different from those along the other vector. What is essential in that respect however is that the raster width is less than 300 µm for at least one of the vectors.

In addition it is also possible for the zones 41 to occur in succession only in one direction and for the zones thus to be for example of a width of 200 µm and a length of several mm. That is also the case with a 1D moiré pattern.

Figure 1:
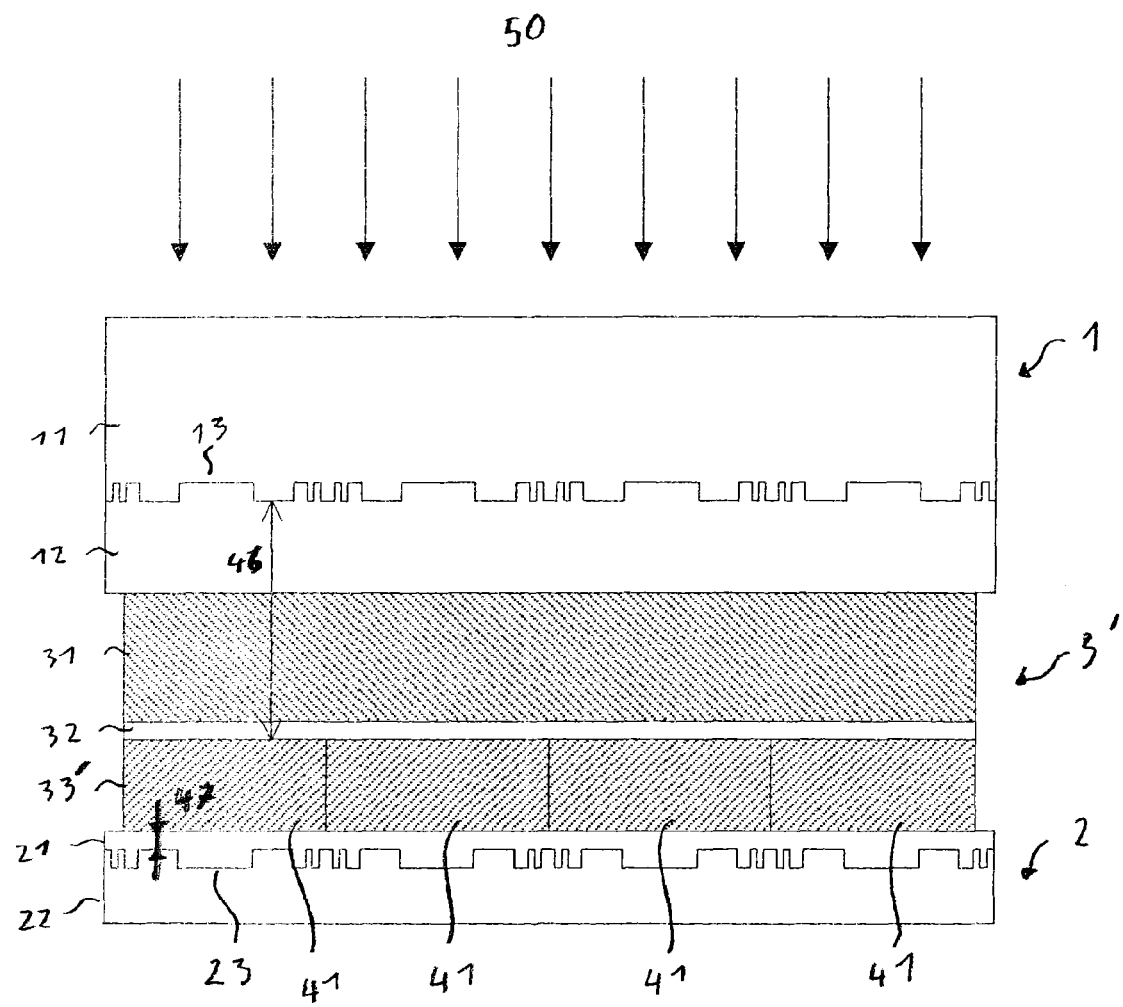
FIG. 1 shows a view to illustrate the production of a security element according to the invention.

Production of the film body 3' formed from the carrier layer 31, the adhesive bonding layer 32 and the transparent layer 33 and the detailed configuration of the transparent layer 33 are described in detail hereinafter with reference to FIG. 1:

FIG. 1 shows the film body 3' comprising the carrier layer 31, the adhesive bonding layer 32 and the transparent layer 33 which has not yet hardened, the photopolymer layer 33' as well as two masters 1 and 2 which serve for shaping the desired arrangement of Bragg planes in the zones 41 of the transparent layer 33.

In that respect the procedure for production of the film body 3' is as follows: The adhesive bonding layer 32 is applied to the carrier layer 31, followed then by a photopolymer layer 33' as a photosensitive layer, preferably over the full surface area involved, by means of printing, casting, running or scraping thereon. The photopolymer of the photopolymer layer is a photopolymer in which the desired changes in refractive index can be afforded by exposure to light. The photopolymer is for example the photopolymer Omni DX 706 from DuPont, which has the aforementioned properties of a change in refractive index due to exposure. A further example of a photopolymer are silver halide emulsions, liquid photopolymer or dichromatic gelatin.

After application of the photopolymer layer 33' to the adhesive bonding layer 32 the photopolymer layer 33' is exposed by means of the arrangement shown in FIG. 1: The masters 1 and 2 are arranged on both sides of the film body 3' with the photopolymer layer 33'. For that purpose the film body 3' is laid for example in a stop-and-go procedure between two flat masters or also arranged in a continuous mode of operation between two masters 1 and 2 which are in the form of exposure rollers. The master 1 is in the form of a master which is operative in a transmission mode and the master 2 is in the form of a master which is operative in a reflection mode. The master 1 has layers 11 and 12, between which a surface structure 13 is shaped. The layers 11 and 12 comprise different materials which differ in their optical refractive index by more than 0.2, preferably by more than 0.5. The layers 11 and 12 are thus for example two plastic layers which differ in their refractive index and the interface of which shapes the surface structure 13. In addition however it is also possible to arrange between the layers 11 and 12 an HRI layer or an LRI layer or a succession of a plurality of HRI layers and LRI layers, in the interface of which in relation to the layer 11 and/or the layer 12 the surface structure 13 is shaped (HRI=high refractive index; LRI=low refractive index). Preferably inorganic materials, for example $MgF_2$, $Si_xO_y$, $TiO_2$ or ZnS are used as the material for the HRI or LRI layers. In that case it is then also possible for the layers 11 and 12 to comprise the same material or to comprise materials which are of substantially the same refractive index. It is also possible for the layer 11 to be omitted. Then the master adjoins air.

The master 2 has a layer 21 and a layer 22. The layer 21 is a layer which is transparent in the range of the wavelength used for the exposure operation. The layer 22 is a reflection layer, preferably a metallic reflection layer. Shaped in the surface of the layer 22 is a surface structure 23 forming the interface layer between the layers 21 and 22.

In addition it is also possible to dispense with the layer 21 so that the surface of the reflection layer 22 is in direct contact with the photopolymer layer 33'.

The surface structures 13 and 23 involve binary surface structures, the structure elements of which are almost rectangular and the structure depth of which is in the range of between 100 nm and 1000 nm. The spacing of the structure elements of the surface structures 13 and 14 is in the range of between 50 and 1000 nm, preferably between 100 nm and 300 nm. In addition the surface structures 13 and 14 shaped in the master 1 and the master 2 are arranged in accurately mutually fitting relationship and are shaped in the form of mutually inverse surface structures. That is shown for example in FIG. 1 from which it can be seen that the surface structure 23 corresponds to the surface structure 13 which is mirrored at the surface of the photopolymer layer 33'. In addition the surface structures 13 and 23 are oriented in register relationship with the zones 41. As can be seen from FIG. 1 the surface structures 13 and 23 are in this case in the form of a structure which is symmetrical with respect to the center line of the respective zone 41, wherein the spacing of the structure elements and also the width of the structure elements decreases, starting from the center point of the zones 41 to the boundary line of the respective zone 41 with the adjacent zone. Furthermore it is also possible for the surface structures 13 and 23 to be of respectively point-symmetrical configuration relative to the center point of the zones 41.

Instead of using binary surface structures, it is also possible, as already stated above, to use asymmetrically diffractive structures or also refractive structures. In addition it is also possible to provide different surface structures in the first and second masters in different zones 41, in which case also the surface structures of the first and second masters are in the form of inverse surface structures. It is also possible for the surface structures 13 or 23 to be flat, that is to say the master 2 is a mirror or the master 1 is omitted.

The layers 12 and 21 of the first master and the second master respectively further also serve as a spacer layer so that the top side of the photopolymer layer 33', that is towards the first master, is at a distance 46 from the surface structure 13 and the underside of the photopolymer layer 33', that is towards the master 2, is at a distance 47 from the surface structure 23. Preferably the distance 46 is of a value of between 10 µm and 200 µm and the distance 47 is of a value of between 0 µm and 100 µm. Liquids can also be used as the layers 12 and 21, for example oil, glycerin or water. Advantageously the layers 12 and 21 are of a refractive index which is almost equal to or which differs only very slightly (for example between 0.2 and 0.5) from the refractive index of the photopolymer layer 33'.

The FIG. 1 arrangement is now irradiated with coherent light. For that purpose a light beam from a corresponding suitable light source, for example a laser, is suitably expanded to a suitable thickness and thus the wave form shown in FIG. 1 is generated. The enlarged light beam passes through the master 1 arranged between the photopolymer layer 33' and the light source, is deflected by the master 1 in accordance with the surface structure 3, passes through the photopolymer layer 33' and is diffracted back by the surface structure 23 shaped in the reflection layer 22, in accordance with the surface structure 23, and then again passes through the photopolymer layer 33'. Thus, formed in the photopolymer layer 33' is an interference pattern which is formed by the superpositioning of those light beams and which in the photopolymer layer 33' produces a corresponding three-dimensional pattern with regions of a differing refractive index.

After the conclusion of the exposure process the photopolymer material of the photopolymer layer 33' is polymerized for example by irradiation with UV light or by an electron beam and is thus hardened.

Then, the adhesive bonding layer 34 and the pattern layer 35 are applied to the transparent layer 33 formed in that way. As an alternative thereto the adhesive bonding layer or barrier layer 34 can be applied, and then the adhesive layer. The film is then applied to the pattern layer 35.

The pattern layer 35 comprises one or more layers which are partially shaped and provide pattern regions 43 and background regions 44 which differ in their optical properties. As shown for example in FIG. 2 in that case the pattern layer 35 has a multiplicity of zones 42 of a smallest dimension of less than 300 µm, which are arranged in accordance with a grid raster in a one-dimensional or two-dimensional succession in mutually adjacent relationship and which each have a pattern region 43 and a background region 44 which shape a coding. The raster of the pattern layer 35 can accordingly be of a configuration as described above for the raster of the transparent layer 33. The codings in the zones 42, provided by the pattern regions 43 and background regions 44, are preferably identical codings, but it is also possible for the codings in adjacent zones 42 to differ.

In the FIG. 2 embodiment the pattern layer 35 is a partially metallized layer, wherein the metal of the metal layer is provided in the pattern regions 43 and is not provided in the background regions 44. It is however also possible for the different optical properties of the pattern layer 35 to be achieved by different reflection properties, different colors or different optically variable effects in the pattern regions 43 and the background regions 44.

The adhesive layer 36 is then applied to the pattern layer 35, preferably in a layer thickness of between 0.5 µm and 4 µm.

In the embodiment shown in FIGS. 2 and 3 the Bragg planes of the transparent layer are shaped in the zones 41 and 41' to provide different transmissive imaging functions. Here for example the spacing of the structure elements and the width of the structure elements of the surface structures 13 and 23 differ in the zones 41 and 41'. The zones 41' form a group 61 of adjacent zones and the zones 41 form a group 62 of adjacent zones. In this embodiment the coding of the regions 42 is selected to be identical and the raster width of the raster of the transparent layer 33 and the pattern layer 35 differs by between 0 μm and 15 μm. An optically variable, enlarged representation of the coding is afforded to the human viewer both in the region of the group 61 and also in the region of the group 62, the optically variable effect in the region of the group 61 differing from that of the group 62 so that an extremely striking and easily remembered security feature is generated for the human viewer.

In accordance with a further alternative the pattern layer 35 and the transparent layer 33 are part of a laminate, for example an ID card. For that purpose the pattern layer 35 is applied to a substrate and the substrate is provided with an optional transparent layer and then the transparent layer 33 (optionally with the layers 31 and 32) is fixed by means of the adhesive layer in accurate register relationship with the pattern layer 35 on the transparent layer or the pattern layer 35 respectively. A protective layer, in particular a plastic film, is then placed on the film body formed in that way and the resulting film body is then laminated in a laminator for example to give an ID card.

In addition it is also possible for the transparent layer 33, optionally with the layers 31 and 32, to be applied on one side of a transparent carrier substrate, and for the pattern layer 35 to be applied on the other side of the carrier substrate. The carrier preferably involves the carrier of a bank note, which is transparent at least in the region in which the transparent layer 33 is applied, for example the carrier of a polymer bank note.

In a further embodiment of the invention the transparent layer 33, optionally with the layers 31 and 32, is applied to a bendable or foldable carrier substrate and the pattern layer 35 is applied to another region of the carrier substrate. The transparent layer 33 and the pattern layer 35 can then be brought into overlapping coincident relationship by folding or bending of the carrier substrate, whereby an optically variable effect becomes visible. Preferably in that case the carrier substrate is also transparent and the transparent layer 33 on the one hand and the pattern layer 35 on the other hand are applied on opposite sides of the carrier substrate.

The invention claimed is:

1. A security element having a top side and an underside, wherein the security element has a transparent layer with a non-homogenous refractive index, thereby having a refractive index variation in which a plurality of Bragg planes are formed in said transparent layer by said refractive index variation, wherein the transparent layer is of a layer thickness of between 5 μm and 200 μm and wherein the transparent layer has a plurality of first zones of a smallest dimension of less than 300 μm, which are arranged in accordance with a first grid raster in a one-dimensional or two-dimensional succession in mutually adjacent relationship and wherein, in said first zones, the Bragg planes are respectively shaped in said transparent layer to provide a respective transmissive optical imaging function.

2. A security element as set forth in claim 1, wherein the security element has a pattern layer with a plurality of second zones of a smallest dimension of less than 300 μm and which are arranged in accordance with a second grid raster in a one-dimensional or two-dimensional succession in mutually adjacent relationship, wherein each second zone has a pattern region and a background region which differ in their optical properties and which are shaped to provide a coding.

3. A security element as set forth in claim 2, wherein the pattern regions and the background regions are shaped in the second zones to provide identical codings.

4. A security element as set forth in claim 2, wherein the pattern regions and the background regions are shaped in a first group of second zones to provide identical first codings and are shaped in a second group of second zones to provide identical second codings, the first and second codings being different codings.

5. A security element as set forth in claim 4, wherein a plurality of second zones of the first group are arranged in mutually adjacent relationship and occupy a first region of a smallest dimension of more than 300 μm.

6. A security element as set forth in claim 4, wherein a plurality of second zones of the second group are arranged in mutually adjacent relationship and occupy a second region of a smallest dimension of more than 300 μm.

7. A security element as set forth in claim 2, wherein the pattern region and the background region differ in their color.

8. A security element as set forth in claim 2, wherein the pattern region and the background region differ in their transmissivity or opacity.

9. A security element as set forth in claim 2, wherein the pattern region and the background region differ in their reflection properties.

10. A security element as set forth in claim 2, wherein the pattern layer has a layer into which a surface structure is shaped.

11. A security element as set forth in claim 10, wherein the surface structure is a diffractive surface structure.

12. A security element as set forth in claim 10, wherein different surface structures are shaped in the pattern region and in the background region.

13. A security element as set forth in claim 2, wherein the pattern layer has a partial reflection layer which is provided in the pattern regions and not in the background regions or which is provided in the background regions and not in the pattern regions.

14. A security element as set forth in claim 1, wherein the Bragg planes in the first zones are arranged in respectively mutually parallel relationship and are spaced from each other respectively at between 200 nm and 700 nm.

15. A security element as set forth in claim 1, wherein the Bragg planes in the first zones are respectively equidistantly spaced from each other.

16. A security element as set forth in claim 1, wherein the Bragg planes in the first zones respectively include an angle of between 5° and 45° with the plane defined by the top side of the security element.

17. A security element as set forth in claim 1, wherein the Bragg planes of the transparent layer in the first zones are adapted to produce identical transmissive imaging functions.

18. A security element as set forth in claim 1, wherein the Bragg planes of the transparent layer in a first group of first zones are adapted to provide identical first transmissive imaging functions and in a second group of first zones are adapted to provide identical second transmissive imaging functions, the first and second imaging functions being different imaging functions.

19. A security element as set forth in claim 18, wherein a plurality of first zones of the first group are arranged in mutually adjacent relationship and occupy a third region of a smallest dimension of more than 300 μm.

20. A security element as set forth in claim 18, wherein a plurality of first zones of the second group are arranged in mutually adjacent relationship and occupy a fourth region of a smallest dimension of more than 300 μm.

21. A security element as set forth in claim 1, wherein the Bragg planes of the transparent layer are adapted to provide different transmissive optical imaging functions in the first zones, wherein the imaging functions of adjacent first zones continuously change in a spatial direction.

22. A security element as set forth in claim 1, wherein transmissive optical imaging function is a positive or negative lens function.

23. A security element as set forth claim 1, wherein in the first zones, a respective plurality of Bragg planes intersects a section plane oriented perpendicularly to the top side of the transparent layer in a section line having an arcuate portion of a length of more than 5 μm, wherein the circle diameter of the circular arc is between 5 and 250 μm.

24. A security element as set forth in claim 2, wherein the first raster and the second raster have an angular displacement of more than 0 degrees relative to each other.

25. A security element as set forth in claim, wherein the first raster and the second raster differ in at least one spatial direction in their raster width at between 0 and 5%.

26. A security element as set forth in claim 1, wherein the layer thickness of the transparent layer is between 20 μm and 100 μm.

27. A security element comprising a transparent layer having a refractive index variation, wherein a plurality of Bragg planes are formed in said transparent layer by said refractive index variation, said transparent layer having a layer thickness of between 5 μm and 200 μm and having a plurality of first zones of a smallest dimension of less than 300 μm, said first zones being arranged in accordance with a first grid raster in a one-dimensional or two-dimensional succession in mutually adjacent relationship, wherein the Bragg planes are respectively shaped in said first zones of said transparent layer to provide a respective transmissive optical imaging function, said transmissive optical imaging function being at least one of a prismatic imaging function, a positive lens function or a negative lens function achieved by said refractive index variation.

28. A security element comprising:
 a transparent layer having a refractive index variation, wherein a plurality of Bragg planes are formed in said transparent layer by said refractive index variation, said transparent layer having a layer thickness of between 5 μm and 200 μm and having a plurality of first zones of a smallest dimension of less than 300 μm, said first zones being arranged in accordance with a first grid raster in a one-dimensional or two-dimensional succession in mutually adjacent relationship, wherein the Bragg planes are respectively shaped in said first zones of said transparent layer to provide a respective transmissive optical imaging function; and
 a pattern layer different from said transparent layer, said pattern layer having a plurality of second zones of a smallest dimension of less than 300 μm, said second zones being arranged in accordance with a second grid raster in a one-dimensional or two-dimensional succession in mutually adjacent relationship, wherein each second zone has a pattern region and a background region which differ in their optical properties and which are shaped to provide a coding.

29. A security element comprising a transparent layer having a refractive index variation, wherein a plurality of Bragg planes are formed in said transparent layer by said refractive index variation, said transparent layer having a layer thickness of between 5 μm and 200 μm and having a plurality of first zones of a smallest dimension of less than 300 μm, said first zones being arranged in accordance with a first grid raster in a one-dimensional or two-dimensional succession in mutually adjacent relationship, wherein the Bragg planes are respectively shaped in said first zones of said transparent layer to provide a respective transmissive optical imaging function, and wherein the Bragg planes in the first zones are respectively oriented at an angle of between 5° and 45° with respect to a plane defined by a top side of the security element.

* * * * *